June 28, 1955  E. B. NOLT  2,712,042
SIGNALLING MECHANISM
Original Filed Oct. 30, 1951
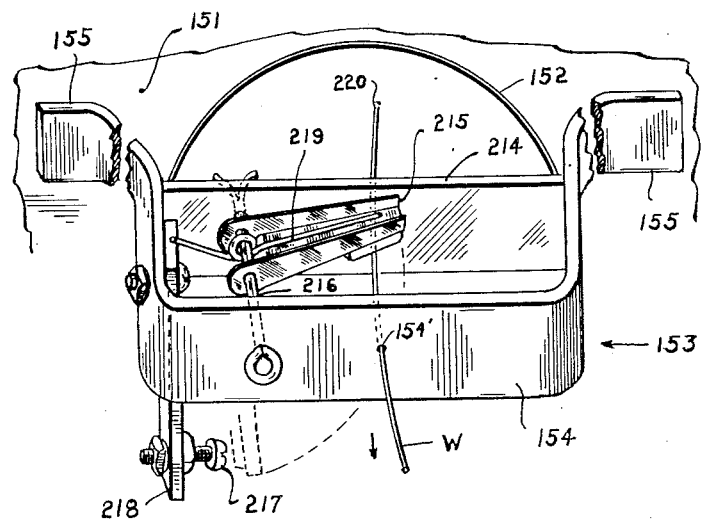
Inventor:
Edwin B. Nolt
By Richard E. Babcock Jr.
Attorney

United States Patent Office 2,712,042
Patented June 28, 1955

2,712,042
SIGNALLING MECHANISM

Edwin B. Nolt, New Holland, Pa., assignor to The Sperry Corporation, New York, N. Y., a corporation of Delaware Original application October 30, 1951, Serial No. 183,321. Divided and this application November 26, 1952, Serial No. 322,714

2 Claims. (Cl. 200—61.18)

This invention relates to a signalling mechanism for indicating exhaustion of a supply of flexible tension material, and more particularly to such a mechanism for indicating exhaustion of the supply of banding material utilized by the tying mechanism of an automatic pick-up baler for banding the bales of hay formed thereby.

This is a division of my copending application Serial No. 183,321, filed October 30, 1951.

In the usual pick-up baler, the completed bales are banded either by wire or twine which is drawn from a supply of such wire or twine carried on the baler, the wire or twine passing from the supply to a needle or shuttle mechanism which passes it across the bale chamber and around the rear end of a completed bale to deliver it to a suitable tying mechanism which unites it with a free end of wire previously passed around said bale.

Ordinarily when the supply of wire or twine becomes exhausted, the baler operator is not aware of this fact until the automatic tying mechanism fails to perform its intended function, with the result that unbanded bales are formed and ejected from the baler. Where this occurs, it is necessary for the operator to discontinue the operations while he replenishes the supply of banding material and then proceeds to properly thread the end of a new supply of banding material through the needles and other parts of the tying mechanism.

With the foregoing considerations in mind it is a primary object of the invention to provide means capable of actuating a signal to inform the baler operator of the exhaustion of the supply of the banding material, in ample time so that he may discontinue operation of the baler and replenish the supply before any unbanded bales are formed and before the bitter end of the banding material is drawn through the needles, requiring that they be rethreaded.

A signal actuating means in accordance with the preferred embodiment of the invention is illustrated in the accompanying drawing, in which the figure shows such a means mounted on the wire can or container such as is usually carried by an automatic pick-up baler to hold a reel of wire which is drawn therefrom and used by the tying mechanism of the baler during usual baling operations, the container being shown fragmentarily only.

Referring now in detail to the accompanying drawing, the illustrated container 151 is of a type which is shown and described more fully in my aforesaid copending application 183,321. However, for the purpose of the present application the wire container 151 may be broadly regarded as any means for holding a supply of either wire or twine, which will be normally in the form of either a reel or roll, so that same may be freely payed out from the supply as required by the bale tying mechanism or banding mechanism. It will be seen that the container 151 is provided with a suitable opening 152 through which the wire or other banding material is drawn from the supply thereof within the container 151.

Fixed on the container 151, as by welding, and extending across the opening 152 thereof, is a wire guide, generally designated 153 which is of substantially U-shape having its cross piece 154 disposed to span the opening 152, and its legs terminating in outwardly turned extremities 155 which are secured against the container 151. Connected between the legs of the guide 153 in spaced parallel relation to the cross-piece 154 thereof is rigid member 214, both of the members or portions 154 and 214 respectively being provided with small openings as at 154' in the member 154, whereby these relatively spaced members 154 and 214 may function as relatively spaced guide elements through which the wire may be drawn from the container in the direction of the arrow shown in the drawing.

A signal element comprising a feeler 215 is mounted on the wire guide 153 for movement between the wire guide elements 154 and 214 respectively and across the path of the wire W from an inoperative position on one side of the wire, as shown in full lines in the figure, to an operative position on the other side thereof, as shown in broken lines in the figure. In the preferred embodiment, the feeler 215 comprises the movable contact or contact arm of an electric switch, same being supported for swinging movement between the elements 154 and 214 on a pintle 216 supported between said elements 154 and 214, it being apparent that the pintle 216 serves as a guide for the feeler 215 during its swinging movement.

A fixed contact 217, which may be regarded as a signal actuating element, is supported on an insulating element 218, carried by the wire guide 153 in the path of movement of the switch arm or contact 215, for operative engagement thereby. A suitable spring means 219 coiled about the pintle 216 with its opposite ends exerting a torque against the fixed member 218 and the feeler 219 respectively serves to resiliently urge the feeler or switch arm 215 toward operative engagement with its coacting fixed contact 217.

In the operation of the invention it will be seen that the switch arm 215 is normally held in a retracted inoperative position by the wire W, a portion of which is guided by the elements 154 and 214 to extend across the path of movement of the switch arm 215 between its inoperative and operative positions. However, as the roll or supply of wire W is exhausted, and the bitter end 220 thereof shown in the drawing is drawn through the guide element 214, this permits the switch arm 215 to immediately swing downwardly under the action of spring 219 to operatively engage the fixed contact 217 and close an electrical circuit through said contacts 215 and 217.

The warning means here shown may be connected into a circuit to sound a buzzer or other signal device but preferably is connected to the spark system of the motor on the baler to cause the motor to misfire or stop as the operator prefers, thus a buzzer may be energized or the motor grounded out to warn the operator of the baler of the fact that the wire supply is low. Inasmuch as such warning will be given just as the bitter end of the banding material is withdrawn from its source of supply, the baler operator will normally be informed of the exhaustion of the supply of banding material so that he may replenish same in ample time before any unbanded bales are formed or before it becomes necessary to rethread the tying mechanism of the baler.

In this application I have shown only the preferred embodiment of the invention as employed in conjunction with the tying mechanism of an automatic baler, merely, in order to set forth the best mode contemplated by me of carrying out my invention, as required by law. However, I recognize that my invention is capable of modification, that it is capable of other uses, and also that its several details may be modified in various ways, all without departing from my invention. Accordingly, the drawing and description herein, are to be regarded as merely illustrative in nature and not as excluding other forms of the invention.

Having thus described my invention, I claim:

1. A signaling mechanism for indicating exhaustion of a supply of flexible tension material from a container, comprising a guide mounted on said container and having a pair of relatively spaced guide elements through which the material is drawn from said container, a feeler mounted on said guide for swinging movement between said elements across the path of said material from an inoperative position on one side of said material to an operative position on the other side thereof, said feeler comprising the movable contact of an electric switch, said material normally retaining the feeler in its inoperative position and the exhaustion of said material permitting movement of the feeler to its operative position, a fixed contact being disposed on the opposite side of said elements from the movable contact in the inoperative position of the latter for engagement by said movable contact when the latter is released for movement to its operative position responsive to exhaustion of the supply of said material.

2. A signaling mechanism for indicating exhaustion of a supply of wire drawn from a source of supply, comprising a wire guide mounted adjacent said source and having a pair of relatively spaced guide elements through which the wire is drawn from said source, a feeler, said feeler comprising the movable contact of an electric switch, means guiding same for movement between said elements across the path of the wire from an inoperative position on one side of the wire to an operative position on the other side thereof, means resiliently urging said feeler toward operative position, said wire normally retaining said feeler in its inoperative position, the feeler moving to operative position as said wire is exhausted from said supply and drawn past said feeler, and a fixed contact disposed on the opposite side of said guide elements from the said movable contact in the inoperative position of the latter and in position for engagement by said movable contact when the latter is released for movement to its operative position responsive to the exhaustion of said wire.

References Cited in the file of this patent

UNITED STATES PATENTS

| Number | Name | Date |
|---|---|---|
| 404,651 | Paca | June 4, 1889 |
| 1,582,927 | Hentschell et al. | May 4, 1926 |
| 1,641,658 | Berglund | Sept. 6, 1927 |
| 1,657,901 | Rider | Jan. 31, 1928 |
| 1,725,469 | Millingar et al. | Aug. 20, 1929 |
| 2,121,376 | Wachsman et al. | June 21, 1938 |
| 2,144,124 | Rozyskie | Jan. 17, 1939 |
| 2,227,303 | Flaws, Jr. | Dec. 31, 1940 |
| 2,579,407 | Turner | Dec. 18, 1951 |
| 2,584,734 | Owens | Feb. 5, 1952 |